United States Patent Office 3,445,521
Patented May 20, 1969

3,445,521
PROMOTED ANTIMONY-IRON OXIDATION CATALYST
James L. Callahan, Bedford Heights, Robert K. Grasselli, Garfield Heights, and Warren R. Knipple, Bedford, Ohio, assignors to The Standard Oil Company, Cleveland, Ohio, a corporation of Ohio
No Drawing. Filed Nov. 17, 1966, Ser. No. 594,985
Int. Cl. C07c 121/32, 47/22, 45/10
U.S. Cl. 260—604    3 Claims

ABSTRACT OF THE DISCLOSURE

A process for the catalytic oxidation of olefins such as propylene or isobutylene to the corresponding unsaturated aldehydes, acrolein and methacrolein, respectively, using a base catalyst composed of the oxides of antimony and iron, promoted with various metallic oxides.

---

This is a continuation-in-part of U.S. Patent 3,338,952, which in turn is a continuation-in-part of our copending U.S. patent application Ser. No. 311,630, filed Sept. 26, 1963, now abandoned.

This invention relates to the catalytic oxidation of olefins to aldehydes and conjugated dienes and to the catalytic ammoxidation of olefins to nitriles. The catalytic oxidation reactions of this invention are exemplified by the oxidation of propylene to acrolein, the oxidation of isobutylene to methacrolein, the oxydehydrogenation of an olefin having 4 to 8 carbons, such as the oxydehydrogenation of butene-1 to butadiene-1,3, the ammoxidation of propylene to acrylonitrile and the ammoxidation of isobutylene to methacrylonitrile.

The promoted antimony oxide-iron oxide catalysts useful in the process of this invention are based on the antimony oxide-iron oxide catalysts disclosed in U.S. Patent No. 3,197,419. Attrition resistant catalysts of these types are described more completely in the copending U.S. patent application of James L. Callahan and Warren R. Knipple, Ser. No. 279,308, filed May 9, 1963, and now Patent No. 3,341,471.

The antimony oxide-iron oxide base catalyst disclosed in the aforementioned U.S. patent and copending patent application is referred to as a mixture of antimony and iron oxides, but this is not to be construed as meaning that the catalyst is composed either in whole or in part of these compounds. The proportions of antimony and iron in the catalyst system vary widely. The Sb:Fe atomic ratio can range from about 1:50 to about 99:1. However, optimum activity appears to be obtained at Sb:Fe atomic ratios within the range of from 1:1 to 25:1.

The catalyst can be employed without support and will display excellent activity. It is preferred that the catalyst be combined with from 5 to 95% by weight of a silica support, and preferably at least 10% up to about 90% of the supporting compound by weight of the entire composition is employed in this event. In addition to silica, other support materials can be used, such as, for example, alumina, alundum, silicon carbide and alumina-silica.

In the preparation of the base catalyst useful in this invention, the antimony oxide and iron oxide can be blended together, or can be formed separately and then blended or formed separately or together in situ.

The iron oxide component of the base catalyst useful herein can be provided in the form of ferrous, ferric or ferrous-ferric oxides, or by precipitation in situ from a soluble iron salt, such as the nitrate, acetate or a halide, such as the chloride. Free iron can be used as a starting material, and if antimony metal is also employed, the antimony can be converted to the oxide and the iron to the nitrate simultaneously by oxidation in hot nitric acid. A slurry of hydrous antimony oxide in nitric acid can be combined with a solution of an iron salt, such as ferric nitrate, which is then precipitated in situ as ferric hydroxide by making the solution alkaline with ammonium hydroxide, the ammonium nitrate and the other ammonium salts being removed by filtration of the resulting slurry or by thermal decomposition.

It will be apparent from the above that ferrous and ferric bromides, chlorides, fluorides and iodides, nitrates, acetates, sulfites, sulfates, phosphates, thiocyanates, thiosulfates, oxalates, formates and hydroxides can be employed as the source of the iron oxide component.

The catalytic activity of the basic catalyst system, as well as the promoted catalysts embodied in the present invention, is enhanced by heating the catalyst at an elevated temperature. Preferably, the catalyst mixture is dried and heated at a temperature of from about 500 to 1500° F., more preferably at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F. for from one to forty-eight hours, in the presence of oxygen or an oxygen-containing gas, such as air. Usually this limit is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed will be replaced.

The antimony oxide-iron oxide base catalyst composition useful in the present invention can be defined by the following empirical formula:

where $a$ is 1 to 99, $b$ is 50 to 1, and $c$ is a number taken to satisfy the average valences of antimony and iron in the oxidation states in which they exist in the catalyst as defined by the empirical formula above. Thus the Sb valnece may range from 3 to 5 and the Fe valence from 2 to 3.

Metals selected from Groups I–B, II–A, II–B, III–A, III–B, IV–A, IV–B, V–A, V–B, VI–A, VI–B, VII–B and VIII of the Periodic Table have been found to enhance the activity of the above-described antimony-iron oxide catalyst for the conversion of olefins to aldehydes, diolefins and nitriles. Specific metals which function as promoters in combination with the base catalysts are bismuth, copper, tin, germanium, uranium, rhenium, niobium, silver, cerium, tellurium, tungsten, manganese, gallium, lead, tantalum, palladium, cadmium, zirconium, thorium, vanadium, nickel, titanium, molybdenum, zinc, barium, calcium, thallium, arsenic and rhodium. Most preferred promoter metals are bismuth, copper, tin, germanium, uranium, rhenium, niobium, silver, cerium, tellurium, tungsten, manganese, gallium, lead, tantalum, palladium, cadmium, zirconium, thorium, moylbdenum, zinc, barium, calcium, thallium and arsenic. These promoter metals are incorporated into the base catalyst preferably in the form of their oxides in amounts from about 0.01 to 20% by weight based on the weight of the promoted base antimony-iron oxide catalyst exclusively of the carrier material. Most preferred is a range of from about 1 to 10% by weight of the promoter element based on the base antimony oxide-iron oxide catalyst.

The promoter elements may be incorporated into the base catalyst by co-precipitation, by impregnation, or by other means.

OXIDATION OF OLEFINS TO OXYGENATED COMPOUNDS

The reactants used in the oxidation to oxygenated compounds are oxygen and an olefin having only three carbon atoms in a straight chain such as propylene or isobutylene or mixtures thereof.

The olefins may be in admixture with paraffinic hydrocarbons, such as ethane, propane, butane and pentane; for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g., temperatures in the range of 500 to 1100° F. may be advantageously employed. However, the process may be conducted at other pressures, and in the case where superatmospheric pressures, e.g., above 100 p.s.i.g. are employed, somewhat lower temperatures are possible. In the case where this process is employed to convert propylene to acrolein, a temperature range of 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time will, of course, vary depending upon the olefin being treated, but in the case of propylene and isobutylene, the preferred apparent contact time is 0.15 to 15 seconds.

A molar ratio of oxygen to olefin between about 0.5:1 to 5:1 generally gives the most satisfactory results. For the conversion of propylene to acrolein, a preferred ratio of oxygen to olefin is from about 1:1 to about 2:1. The oxygen used in the process may be derived from any source; however, air is the least expensive source of oxygen and is preferred for that reason.

We have also discovered that the addition of water to the reaction mixture has a marked beneficial influence on the course of the reaction in that it improves the conversion and the yields of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:0.5 to 1:10 will give very satisfactory results, and a ratio of from 1:0.75 to 1:6 has been found to be optimum when converting propylene to acrolein. The water, of course, will be in the vapor phase during the reaction.

Inert diluents, such as nitrogen and carbon dioxide, may be present in the reaction mixture.

OXIDATION OF OLEFINS TO NITRILES

The reactants are the same as those used in the oxidation of olefins to aldehydes described above except that ammonia is included as a reactant. Any of the olefins described above can be used.

In its preferred aspect, the process comprises contacting a mixture comprising propylene or isobutylene, ammonia and oxygen with the promoted catalyst of this invention at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present; consequently, the addition of saturated hydrocarbons to the feed to the reaction is contemplated within the scope of this invention. Likewise, diluents, such as nitrogen and the oxides of carbon, may be present in the reaction mixture without deleterious effect.

The molar ratio of ammonia to olefin in the feed to the reactor may vary between about 0.05:1 to 5:1. There is no real upper limit for the ammonia-olefin ratio, but there is generally no reason to exceed the 5:1 ratio. At ammonia-olefin ratios appreciably less than the stoichiometric ratio of 1:1, various amounts of oxygenated derivaties of the olefin will be formed.

Significant amounts of unsaturated aldehydes, as well as nitriles, will be obtained at ammonia-olefin ratios substantially below 1:1, i.e., in the range of 0.15:1 to 0.75:1. Outside the upper limit of this range only insignificant amounts of aldehydes will be produced, and only very small amounts of nitriles will be produced at ammonia-olefin ratios below the lower limit of this range. It is fortuitous that within the ammonia-olefin range stated, maximum utilization of ammonia is obtained and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and the yield of nitrile. However, reactions not including water in the feed are not to be excluded from this invention inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range of from about 550 to 1100° F. The preferred temperature range is from about 800 to 1000° F.

The pressure at which the reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact times in the range of from 0.1 to about 50 seconds may be employed. The optimum contact time will, of course, vary depending upon the olefin being treated, but in general, a contact time of from 1 to 15 seconds is preferred.

THE OXIDATIVE DEHYDROGENATION OF OLEFINS TO DIOLEFINS AND AROMATICS

In accordance with the present invention, this promoted catalyst system is employed in the catalytic oxidative dehydrogenation of olefins to diolefins and aromatic compounds. In the process, the feed stream in vapor form containing the olefin to be dehydrogenated and oxygen is conducted over the promoted catalyst at a comparatively low temperature to obtain the corresponding diolefin or aromatic compound.

By the term "olefin" as used herein is meant the open chain as well as cyclic olefins. The olefins dehydrogenated in accordance with this invention have at least four and up to about eight nonquaternary carbon atoms, of which at least four are arranged in series in a straight chain or ring. The olefins preferably are either normal straight chain or tertiary olefins. Both cis and trans isomers, where they exist, can be dehydrogenated.

Among the many olefinic compounds which can be dehydrogenated in this way are butene-1; butene-2; pentene-1; pentene-2; tertiary pentenes and hexenes having one tertiary carbon atom such as 2-methyl-pentene-1, 3-methylbutene-1, 3,4-dimethyl-pentene-1, 4-methyl-pentene-2; heptene-1; octene-1; cyclopentene; cyclohexene; 3-methyl cyclohexene and cycloheptane.

Open chain olefins yield diolefins, and in general, six-membered ring olefins yield aromatic ring compounds. The higher molecular weight open chain olefins may cyclize to aromatic ring compounds.

The feed stock in addition to the olefin and oxygen can contain one or more paraffinic or napthenic hydrocarbons having up to about 10 carbon atoms, which may be present as impurities in some petroleum hydrocarbon stocks and which may also be dehydrogenated in some cases. In this oxidative dehydrogenation reaction, propylene and isobutylene should not be included in the feed in substantial amounts.

The amount of oxygen should be within the range of from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess of oxygen, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used, unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. Higher pressures up to about 300 p.s.i.g. can be used and have the advantage of simplifying the product recovery.

Only a brief contact time with the catalyst is required for effective dehydrogenation. The apparent contact time with the catalyst can vary from about 0.5 up to about 50 seconds but higher contact times can be used if desired. At these contact times, comparatively small reactors and small amounts of catalyst can be used effectively.

In general, any apparatus of the type suitable for carrying out oxidation reactions in the vapor phase may be employed in the execution of these processes. The processes may be conducted either continuously or intermittently. The catalyst bed may be a fixed bed employing a large particulate or pelleted catalyst or, in the the alternative, a socalled "fluidized" bed of catalyst may be employed.

The reactor may be brought to the reaction temperature before or after the introduction of the reaction feed mixture. However, in a large-scale operation, it is preferred to carry out the process in a continuous manner, and in such a system, the recirculation of the unreacted olefin is contemplated.

The catalyst compositions and oxidation process of this invention are further illustrated in the following examples wherein the amounts of the various ingredients are expressed as parts by weight unless otherwise specified.

Example I

In a typical catalyst preparation 90 grams of antimony metal were completley oxidized in 360 ml. of concentrated nitric acid. To this were added 34.4 grams of

and 172.3 grams of DuPont Ludox HS (an aqueous dispersion of 30% by weight of SiO₂). The mixture was stirred and 28% ammonium hydroxide was added until the pH was about 8. The resulting slurry was filtered and washed and the cake was divided into four equal parts. Nitrates of the promoter elements were then added to each quarter of the filter cake and after thorough blending, the cake was dried overnight at 120° C., calcined for 24 hours at 800° F. and heat-treated fo ran additional 8 hours at 1400° F. The base catalyst composition in this instance consisted of 70 weight percent FeSb$_{8.63}$O$_{14.4}$ and 30 weight percent SiO₂. As described earlier, the promoter compounds were incorporated in the concentration range of from about 1 to 10% by weight based on the weight of the base catalyst.

A catalyst promoted with 1.5% bismuth was prepared by dissolving 1.1 grams of Bi(NO₃)₃·5H₂O in water and the solution was added to a quarter of the wet filter cake described above. The resulting promoted catalyst was dried at 120° C., calcined at 800° F. for 24 hours and heat-treated for 8 hours at 1400° F. Dry weight of the catalyst was 44 grams.

Similarly, a promoted catalyst was prepared adding an aqueous solution of 1.9 grams of Cu(NO₃)₂·3H₂O to the filter cake. The dry weight of the catalyst was 41 grams and the active catalyst component contained 1.7% by weight of Cu.

0.6 gram of SnO was added to a portion of the wet filter cake. The catalyst was dried at 120° C., calcined at 800° F. for 24 hours and heat-treated for 8 hours at 1400° F. The dry weight of the promoted catalyst was 47 grams and the active component contained 1.6% by weight of Sn.

1.4 grams of GeCl₄ were treated with concentrated NH₄OH and then the resulting material was filtered, washed, and mixed with a portion of wet catalyst filter cake. The catalyst was dried at 120° C., calcined at 800° F. for 24 hours and heat-treated at 1400° F. for 8 hours. Dry weight of the catalyst was 41 grams and the active component contained 1.65% by weight of Ge.

1.4 grams of $UO_2(NO_3)_2 \cdot 6H_2O$ were dissolved in water and added to the wet catalyst filter cake mentioned above. The catalyst was dried at 120° C., calcined at 800° F. for 24 hours and heat-treated at 1400° F. for 8 hours. Dry weight of the catalyst was 56 grams. The active portion of the promoted catalyst was found to contain 1.69% by weight of uranium.

Example II

In a typical preparation of an attrition resistant base catalyst, 270 grams of antimony metal were completely oxidized in 1000 mls. of concentrated $HNO_3$, 102.7 g. of $Fe(NO_3)_3 \cdot 9H_2O$ were added and the mixture was evaporated almost to dryness. 301 grams of Du Pont Ludox (an aqueous sol of 30% by weight $SiO_2$) were added and the mixture was brought to a pH of about 8 by the additio nof ammonium hydroxide. The catalyst was filtered and washed with 600 mls. of water in two portions. The catalyst was then dried at 120° C., calcined at 800° F. for 24 hours and heat-treated at 1400° F. for 8 hours.

The above catalyst was then mixed with 100 g. of Ludox and extruded. The extrudate was dried at 120° C. and heat-treated at 1400° F. for 72 hours.

25 grams of the foregoing catalyst in the size range which would pass through a 35 mesh screen and be retained on an 80 mesh screen were mixed with a solution of 0.36 gram of $(NH_4)_6Mo_7O_{24} \cdot 4H_2O$. The resulting promoted catalyst was dried at 120° C., calcined at 800° F. for 2 hours and heat-treated at 1400° F. for 2 hours. This catalyst contained 1.04% by weight of Mo.

Example III

The promoted catalysts which were prepared according to the procedures given in Examples I and II were tested in the ammoxidation reaction of propylene with air and ammonia to produce acrylonitrile. The reactions were carried out in a steady state stainless steel microreactor unit under constant conditions. The reactor contained 5 mls. of catalyst (35–80 mesh), the contact time was 3 seconds, the reaction temperature was 880° F. and the feed was composed of propylene, ammonia and air in the mole ratios 1:1:12, respectively. The results reported in Table I are based on six minute pre-runs followed by a twelve minute product collection runs. The products were isolated by gas chromatography.

TABLE I

| Catalyst, percent promoted: | Percent per pass conversion of propylene to acrylonitrile |
|---|---|
| Re, 1.73% | 70.0 |
| Nb, 1.60% | 65.0 |
| Cu, 1.73% | 65.0 |
| Ag, 1.72% | 62.5 |
| Bi, 1.54% | 61.8 |
| U, 1.69% | 61.6 |
| U, 8.12% | 58.0 |
| Ce, 1.40% | 60.5 |
| Sn, 1.60% | 58.9 |
| Sn, 6.74% | 68.9 |
| Te, 1.51% | 58.0 |
| W, 1.54% | 58.0 |
| Ge, 1.65% | 57.9 |
| Mn, 153% | 55.0 |
| Unpromoted (control) | 50.0 |

Example IV

The procedures of Example III were followed in the conversion of propylene to acrolein. The same catalyst charge, contact time and reaction temperature were used. The feed of propylene and air was used in the mole ratio of 1:10, respectively. The results are given in Table II.

TABLE II

| Catalyst, percent promoted: | Percent per pass conversion of propylene to acrolein |
|---|---|
| Re, 1.73% | 47.9 |
| Nb, 7.16% | 37.5 |
| Cu, 1.73% | 50.6 |
| Ag, 1.72% | 55.0 |
| Sn, 1.60% | 39.5 |
| Te, 1.51% | 53.0 |
| Te, 7.60% | 61.5 |
| W, 1.54% | 38.6 |
| Pb, 1.53% | 43.8 |
| Pd, 1.59% | 40.4 |
| Cd, 1.54% | 37.8 |
| Zr, 1.51% | 54.0 |
| Th, 1.40% | 45.3 |
| Unpromoted | 28.2 |
| Mo, 1.62% | 36.4 |
| Zn, 1.79% | 40.3 |
| Ba, 1.78% | 34.8 |
| Tl, 1.60% | 46.6 |
| Ca, 1.24% | 35.4 |
| Ga, 6.60% | 46.6 |
| Ta, 14.50% | 42.1 |
| As, 1.48% | 37.8 |

Catalysts promoted with combinations of two or more of the promoters listed in Table II gave results superior to those obtained with the unpromoted catalyst in the foregoing type of reaction.

Example V

The procedure of Example III was followed in the reaction of isobutylene, ammonia and air to produce methacrylonitrile. The conditions used in Example III were the same in the present example except the reaction temperature was 770° F., the contact time was 3.6 seconds, the pre-run was 10 minutes, the run was 15 minutes, and the feed mole ratio of isobutylene:ammonia:air was 1:1:15, respectively. The results are given in Table III.

TABLE III

| Promoter | Weight percent of promoter element in catalyst | Percent per pass conversion of isobutylene to methacrylonitrile |
|---|---|---|
| Mo | 1.62 | 50.1 |
| Bi | 1.54 | 50.0 |
| Sn | 1.60 | 48.0 |
| Sn | 6.74 | 45.8 |
| Cu | 1.73 | 46.7 |
| Ta | 1.60 | 45.4 |
| Unpromoted | 0 | 41.3 |
| Doubly promoted catalyst: | | |
| Ag, 1.35% | Bi, 1.37 | 44.3 |
| Re, 1.42% | Bi, 1.35 | 44.8 |

Example VI

The procedures of Example V were repeated in the conversion of isobutylene to methacrolein. The molar feed ratio of isobutylene to air was 1:10, respectively. The results are given in Table IV.

TABLE IV

| Promoter | Weight percent of promoter element in catalyst | Percent per pass conversion of isobutylene to methacrolein |
|---|---|---|
| Mo | 1.62 | 33.4 |
| Mo | 7.21 | 31.6 |
| Bi | 1.09 | 25.4 |
| Unpromoted | 0 | 24.7 |

Example VII

A base catalyst (control) composed of 70% by weight of combined antimony-iron oxides in which the ratio of antimony to iron on an atomic basis was 8.67:1 and 30% by weight of silica was prepared by the procedure of Example I. The various promoters were used in the form of their oxides in an atomic ratio of 0.1 promoter element to 1 of iron in the base catalyst. A hydrocarbon feed mixture of 30% by weight of butene-1 and 70% by weight of butene-2 was employed in the oxidative dehydrogenation reaction. A reaction temperature of 800° F., a contact time of 3 seconds and a run time of 35 minutes were used in each experiment. The feed ratio of 1 hydrocarbon to 12 air was employed. The per pass conversions to butadiene are given in Table V for oxidative dehydrogenation reactions carried out with the control and the various promoted catalyst.

TABLE V

| Catalyst promotor: | Percent per pass conversion of butenes to butadiene |
|---|---|
| None (control) | 55 |
| Nb | 59 |
| Ge | 65 |
| Sn | 59.5 |
| Cu | 58.2 |
| P | 60 |
| Bi | 61.4 |

Similarly, cobalt, tantalum oxides, a mixture of bismuth-nickel oxides and a mixture of bismuth-copper oxides served to promote the activity of the base catalyst even when the promoter elements were used in the atomic ratio of promoter element to iron of 1:1.

We claim:
1. The process for the manufacture of unsaturated aldehydes which comprises contacting in the vapor phase, at a temperature in the range of 500 to 1100° F., a mixture of oxygen and an olefin selected from the group consisting of propylene and isobutylene, said mixture having a molar ratio of oxygen to olefin of from about 0.5:1 to about 5:1, with a catalyst consisting essentially of
  (A) a base catalyst consisting essentially of the oxides of antimony and iron, the Sb:Fe atomic ratio being within the range of about 1:50 to 99:1 and
  (B) a promoter component consisting essentially of an oxide of at least one element selected from the group consisting of bismuth, copper, tin, rhenium, niibium, silver, tellurium, tungsten, gallium, lead, tantalum, palladium, cadmium, zirconium, thorium, molybdenum, zinc, barium, calcium, thallium, and arsenic and
  (C) a silica support
said (B) being present in amounts from about 0.01 to 20% by weight based on the combined weight of $(A)+(B)$.

2. The process of claim 1 wherein the olefin is propylene.

3. The process of claim 1 wherein the olefin is isobutylene.

References Cited

UNITED STATES PATENTS

| 3,197,419 | 7/1965 | Callahan et al. | 252—456 |
| 2,627,527 | 2/1953 | Connolly et al. | 260—604 |

LEON ZITVER, *Primary Examiner.*

R. H. LILES, *Assistant Examiner.*

U.S. Cl. X.R.

252—456; 260—465.3